United States Patent [19]

Fogg, Jr. et al.

[11] Patent Number: 5,251,303
[45] Date of Patent: Oct. 5, 1993

[54] SYSTEM FOR DMA BLOCK DATA TRANSFER BASED ON LINKED CONTROL BLOCKS

[75] Inventors: Richard G. Fogg, Jr., Austin; Joseph R. Mathis, Georgetown; James O. Nicholson, Austin, all of Tex.

[73] Assignee: International Business Machines Corporation, Armonk, N.Y.

[21] Appl. No.: 297,778

[22] Filed: Jan. 13, 1989

[51] Int. Cl.[5] ............................................. G06F 13/28
[52] U.S. Cl. .............................. 395/275; 364/242.31; 364/254.6; 364/240.4; 364/957.3; 364/940.4; 364/DIG. 1; 395/725; 395/425
[58] Field of Search ... 364/200 MS File, 900 MS File; 395/425, 275, 725

[56] References Cited

U.S. PATENT DOCUMENTS

| | | |
|---|---|---|
| 4,040,026 | 8/1977 | Gernelle . |
| 4,065,810 | 10/1977 | Cramer et al. . |
| 4,346,439 | 2/1982 | Huno et al. . |
| 4,451,884 | 6/1984 | Heath et al. . |
| 4,482,951 | 11/1984 | Swaney et al. ............... 364/200 |
| 4,493,051 | 1/1985 | Brezzo et al. . |
| 4,639,852 | 1/1987 | Motomiya ..................... 364/138 |
| 4,700,292 | 11/1987 | Campanini . |
| 4,703,418 | 11/1987 | James . |
| 4,716,525 | 12/1987 | Gilanyi et al. .................. 364/200 |
| 4,729,094 | 2/1988 | Zolnowsky et al. . |
| 4,891,751 | 1/1990 | Call et al. ...................... 364/200 |
| 4,930,065 | 5/1990 | McLagan et al. ............... 364/200 |
| 4,930,069 | 5/1990 | Batra et al. .................... 364/200 |

OTHER PUBLICATIONS

I. C. Johnson, *A Microcontrolled DMA With A Versatile Linked List Capability For LAN Gateway Applications,* IEEE 1986 Military Communications Conference: "Communications-Computers: Teamed For The '90's", Monterey, Calif., Oct. 5-9, 1986, vol. 3, pp. 3831-3835.
IBM Technical Disclosure Bulletin, J. W. Kemp, D. P. Tuttle and M. A. Wieland, vol. 28, No. 9, Feb. 1986.
IBM Technical Disclosure Bulletin, J. T. O'Quin II, vol. 29, No. 4, Sep. 1986.

*Primary Examiner*—Parshotam S. Lall
*Assistant Examiner*—Ken S. Kim
*Attorney, Agent, or Firm*—Andrew J. Dillon

[57] ABSTRACT

A DMA controller has an attached, dedicated memory. Data objects are stored on the heap and connected by pointers. Each data object contains DMA block transfer control parameters. A single block transfer made up of several separate transfers, with each separate transfer defined by one data object. The single block transfer is defined by linking several data objects into a list. The DMA controller consecutively performs the transfers in a linked list without requiring control by a system central processor.

8 Claims, 2 Drawing Sheets

SYSTEM FOR DMA BLOCK DATA TRANSFER BASED ON LINKED CONTROL BLOCKS

BACKGROUND OF THE INVENTION

1. Technical Field

The present invention relates generally to digital computer systems, and more specifically to direct memory access controllers.

2. Background Art

In digital computer systems, it is common to use direct memory access (DMA) to transfer data between a system memory attached to a main system bus and input/output devices. The direction of data transfer can be from the I/O device to memory, or vice versa. A DMA controller is generally used to transfer blocks of data between an I/O device and consecutive locations in the system memory. In order to perform a block transfer, the DMA device needs a starting address for the transfer, and a count of the number of data items, which may be bytes, words, or other units of information which can be transmitted in parallel on the computer system bus. In order to perform a DMA block transfer, the DMA controller can take control of the bus for the duration of the transfer, or can transfer one data item each time the system bus is otherwise idle. The latter technique is sometimes referred to as cycle stealing.

DMA controllers usually are designed to interface with several independent I/O channels, with four or eight being typical. Each I/O channel has its own buffers and control registers to control DMA transfers to and from that channel. The system central processor has direct access to the registers for each channel, so that transfers can be individually controlled.

Each transfer can encompass only a block of consecutively addressed data. In many situations, it would be desirable to make a second block transfer to or from a different location in memory immediately after a first transfer is completed. In a technique known as data chaining, many DMA controllers allow a central processor to load the information required for the second block transfer into another set of control registers within the DMA controller. These control registers may be special registers set aside for the purpose of data chaining, or they can be currently unused control registers for one of the other I/O channels. Upon completion of the first block transfer, the information necessary for the second block transfer is copied over into the control registers for the I/O channel involved, and another block transfer immediately initiated. If the DMA controller implements a function known as auto reload, selected status bits are set when the second block transfer begins. By periodically testing the status bits, the central processor can determine when the second block transfer has been initiated, and load the control information necessary for yet a third block transfer into the data chaining registers if desired.

In certain computer system designs, consecutive block transfers to noncontiguous areas of memory occur frequently. This happens often, for example, in a demand paged virtual memory, in which memory pages are also constantly being transferred between the main system memory and a mass storage device, usually a hard disk.

Files are typically stored as logically consecutive blocks on the disk, and are often loaded into many nonconsecutive page frames in system memory. When writing a file to disk, the scattered page frames must be gathered together for writing in sequence out to disk.

It will be apparent to those skilled in the art that the central processor must be constantly monitoring the status of DMA transfers in order to setup a new transfer each time a previous transfer completes. This generally requires a large number of time consuming interrupts of the central processor, or, worse yet, requires the central processor to periodically poll the status registers of the DMA controller. The necessity for such high degree of central processor involvement in DMA transfers is clearly undesirable.

It would therefore be desirable for a DMA controller to be able to perform a large number of consecutive block transfers to and from noncontiguous memory locations without requiring intervention from a system central processor. Such a controller would be able to perform scatter-gather operations between main system memory and a disk storage device, a very desirable operation in a demand paged virtual memory.

SUMMARY OF THE INVENTION

It is therefore an object of the present invention to provide a direct memory access controller which can transfer a large number of blocks of data between an I/O device and noncontiguous locations in system memory.

It is a further object of the present invention to provide such a direct memory access controller which requires no intervention from a system central processor once the first of a series of block transfers has begun.

Therefore, in order to accomplish these and other objects, a direct memory access controller according the present invention includes a separate memory dedicated to support of DMA functions. This separate memory is organized as a heap containing a plurality of objects. Each object stored on the heap contains control information necessary for one DMA block transfer. Each object also includes a pointer to a next object. A desired number of objects may be chained together into a linked list. When one DMA block transfer is completed, the next object on the list is loaded into the control registers for the current I/O channel, and the next block transfer automatically begun. In this manner, a sequence of block transfers is performed until the end of the list is reached.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
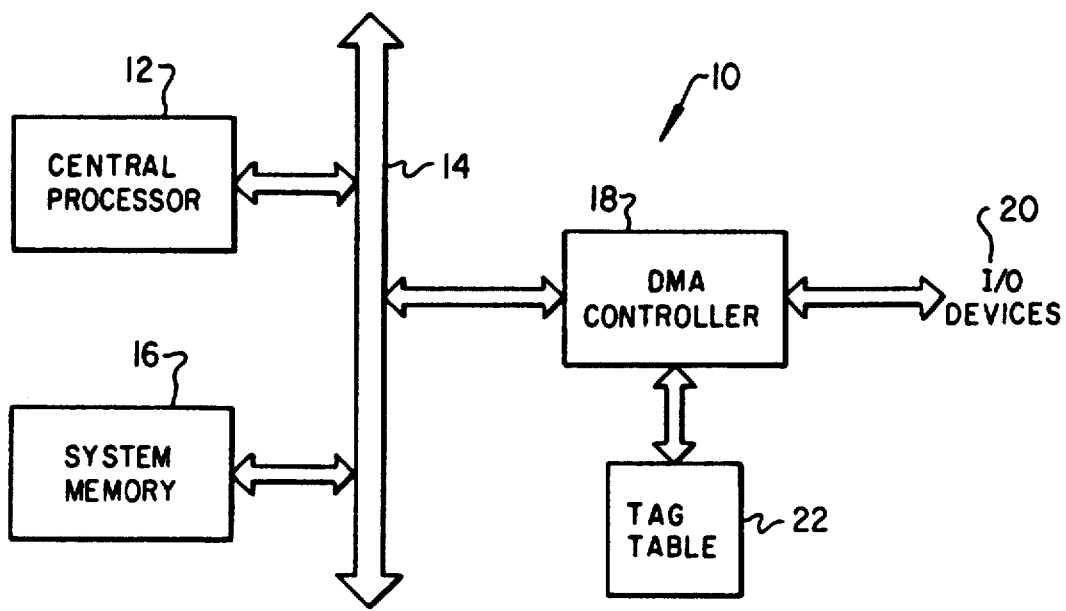
FIG. 1 is a block diagram of a computer system utilizing a DMA controller to interface with I/O devices.

FIG. 1 is a block diagram of a computer system 10. The system 10 includes a central processor 12 connected to a system bus 14. Also connected to the bus 14 are a main system memory 16 and a direct memory access (DMA) controller 18. The DMA controller 18 is the interface between the system memory 16 and all I/O devices 20 connected to the system 10. The I/O devices 20 can include video controllers, serial and parallel ports, and mass storage interfaces such as disk controllers. Also connected to the DMA controller 18 is a separate memory, referred to as a tag table 22. The tag table is a special memory reserved for the use of the DMA controller 18 as will now be described.

Figure 2:
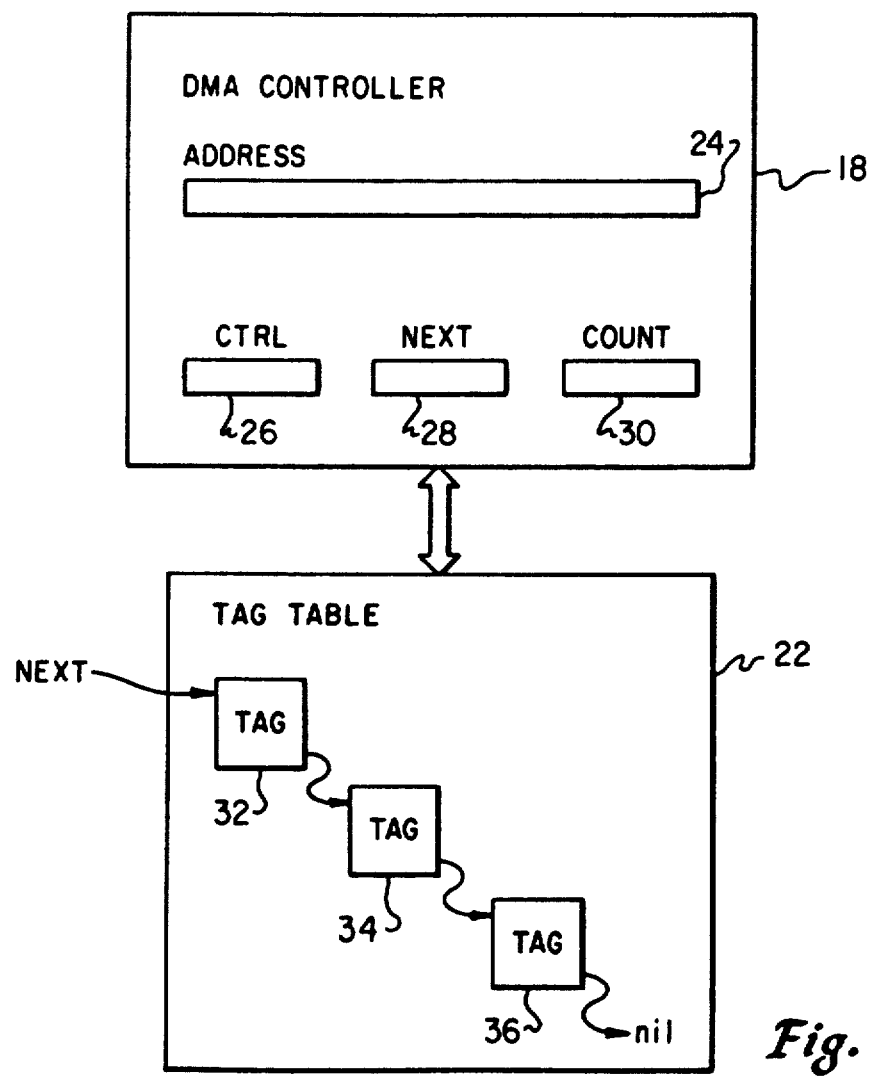
FIG. 2 is a block diagram illustrating the internal organization of a portion of a preferred DMA controller.

FIG. 2 illustrates those internal characteristics of the DMA controller 18 and the tag table 22 which are relevant to the present invention. Each channel of the DMA controller 18 contains four registers to control the DMA operation. These are an address register 24, a control register 26, a next register 28, and a count register 30. At the beginning of a block transfer, the starting address for the block is loaded into the address register 24. The length of the block is loaded into the count register 30. The control register 26 contains information relevant to the transfer, such as whether the transfer is a read from or a write to main system memory. The control register can also contain a bit indicating whether the address register 24 is to be incremented or decremented after each data item is transferred.

Every time a data item is transferred by the DMA controller, the count register 30 is decremented, and the address register 24 is incremented or decremented according to the value of the appropriate bit in the control register 26. When the value of the count register 30 reaches 0, the block transfer has been completed.

At this time, the value in the next register 28 is checked. If it points to a valid object in the heap memory 22, the values contained in that object are loaded into the registers 24, 26, 28 and 30. A next block data transfer then begins automatically.

The tag table 22 contains a plurality of tags. Each tag is a memory object which contains all of the information necessary to reload registers 24, 26, 28, and 30. The tags are organized as a heap, and are linked together by pointers corresponding to the next register 28.

In FIG. 2, three tags 32, 34, 36 are shown. These tags, plus an initial transfer defined by writing values directly into the DMA controller 18 registers, define a single transfer having four separate parts. The value NEXT, contained in the next register 28, points to the first tag 32. That tag points to the next tag 34, which is turn points to the final tag 36. The final tag 36 contains a pointer to NIL indicating that it is the last tag of a list. NIL is a reserved pointer value which does not point to a valid heap object. This value is interpreted by the DMA controller 18 as a pointer to nothing.

Figures 3, 4:
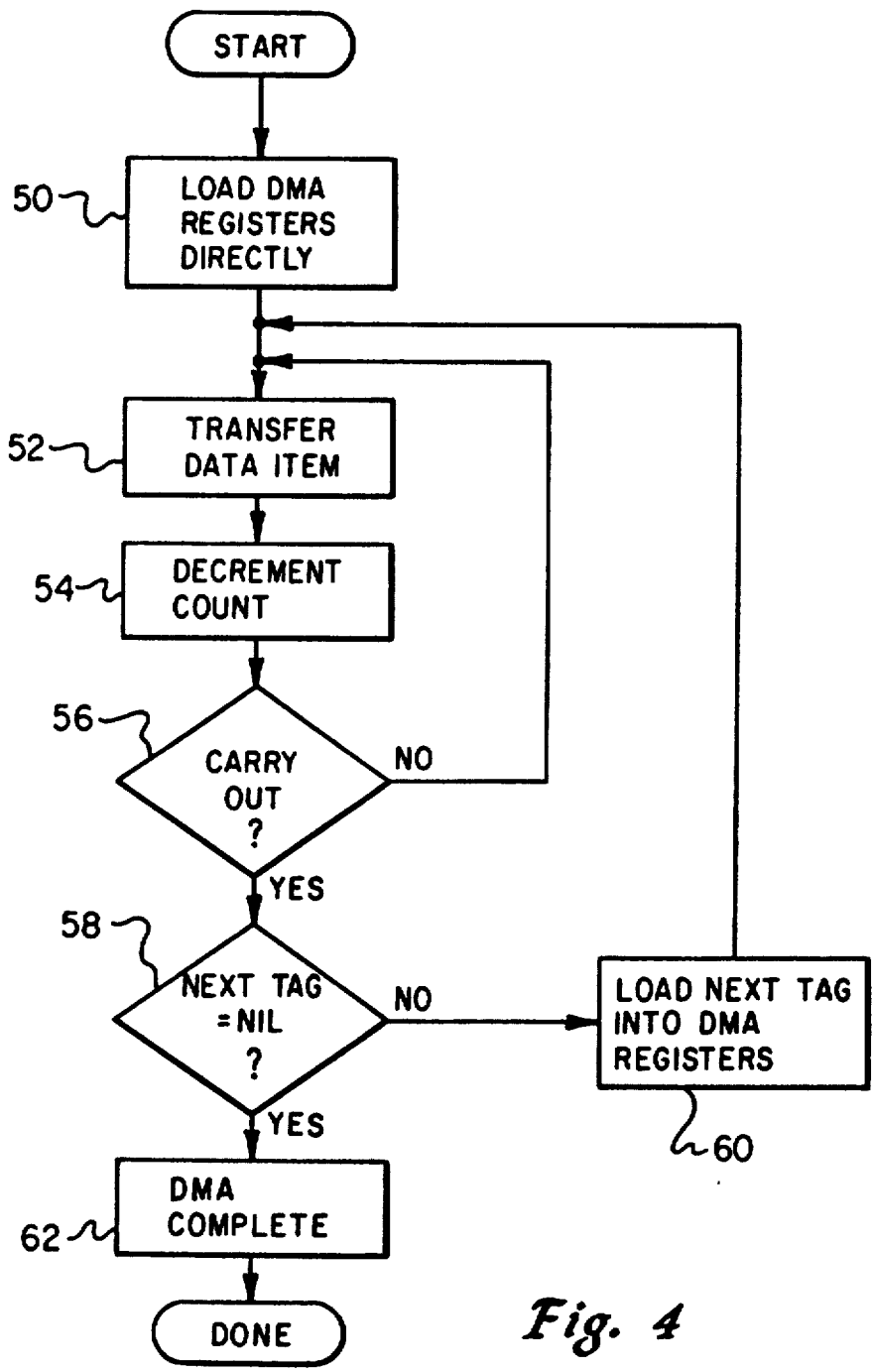
FIG. 3 illustrates the information contained within heap objects.
FIG. 4 is a flowchart illustrating operation of a preferred DMA controller.

FIG. 3 shows a preferred structure for each of the tags in the tag table 22. Each tag contains four fields, an address field 40, a control field 42, a next field 44, and a count field 46. These four fields correspond to the four registers 24, 26, 28, 30 in the DMA controller 18. The 32 bit address field 40 gives the DMA controller 18 access to a 4G byte address space. The 12 bit count field 46 provides for a maximum 4K word transfer, and the 12 bit tag field 44 provides access to 4K tag objects within the tag table 22. NIL is preferably all 0's or all 1's ($FFF^{16}$).

The size of the count field 46 is preferably selected to be equal to the page size within a virtual memory system. Thus, for example, if the virtual memory uses pages having 1K words per page, the count field 46 would only be 10 bits long. These extra bits could be used, if desired, to make the next field 44 14 bits long. Since pages are handled as a unit in virtual memory systems, and consecutive page frames in main memory are often unrelated, making the count field match the page size results in the most efficient use of tag table memory.

Since each tag is eight bytes long, the tag table 22 can be up to 32K words long in order to hold the maximum number of tags.

FIG. 4 shows the control flow used by the DMA controller 18 to make a series of consecutive block transfers. First, the DMA registers 24, 26, 28, 30 are loaded directly with the appropriate values 50 for the first data transfer. At this time, either before or after loading the registers directly, all of the information necessary for the remaining tags for this transfer must be loaded into the tag table 22. This load is performed by the central processor 12.

Next, one data item is transferred 52. The value in the count register 30 is decremented 54. This step includes simultaneously incrementing or decrementing the value of the address register 24, depending upon the desired direction as set in the control register 26.

Next, the test is made to see if the count is complete. This is done by checking the carry out bit 56 from the count register 30. If not, this transfer is not complete, and control returns to step 52. If the value in the count register 30 is 0, control passes to step 58, were the value in the next register 28 is tested to see if it is equal to NIL as described above. If not, the next tag is loaded into the registers in the DMA controller 18 from the tag table 22, and control returns to step 52.

Once the last tag has been used, control falls to step 62. In step 62, an indication is made to the central processor 12 that the transfer is complete. This will generally be done by raising an interrupt on the bus 14.

It will be easily seen by those skilled in the art that the DMA controller described above implements a scatter-gather capability for use in a virtual memory. When a large block of data is to be read into nonconsecutive memory pages, the central processor 12 allocates those pages and sets up the tag table 22 through the DMA controller 18. DMA transfer is then initiated, and the DMA controller 18 handles the entire transfer until it is complete.

A similar technique is used for gathering scattered pages in order to write them to memory. The central processor 12 determines which pages are to be written out, and their order, and sets up the tag table 22 through the DMA controller 18. The DMA transfer is then initiated, and is handled completely by the DMA controller 18 until it is complete.

Since the tag table is organized as a heap, it is possible to keep several linked lists stored therein. This would allow a separate linked list to be kept, for example, for each I/O channel supported by the DMA controller 18. Since the tag table 22 is organized as a heap, the only limit on the number of separate transfers which may be linked into one larger transfer for a single I/O channel is the number of remaining free memory locations within the tag table 22.

While the invention has been particularly shown and described with reference to a preferred embodiment, it will be understood by those skilled in the art that various changes in form and detail may be made therein without departing from the spirit and scope of the invention.

We claim:

1. A system for controlling data transfers in a digital computer between a memory and another device, comprising:
   a controller for transferring data over a system bus between the memory and the other device independently of a central processor, such transfer performed according to transfer control parameters in said controller, said control parameters including a next field; and
   a memory coupled to said controller directly, wherein said controller accesses the memory independently from the system bus, wherein said memory contains a plurality of objects containing transfer control parameters, and wherein, upon completion of a data transfer defined by the transfer control parameters in said controller, the transfer control parameters in a next object identified by the next field are transferred to said controller and a new data transfer automatically begun, whereby a block of data defined by at least two sets of control parameters is transferred.

2. The system of claim 1, wherein said controller contains address, control, and count registers, and the transfer control parameters further include address, control and count values placed respectively into such registers.

3. The system of claim 1, wherein each object contains transfer control parameters which can control a data transfer for up to an amount of data stored in a page frame of a virtual memory system.

4. The system of claim 1, wherein said memory is organized as a heap, wherein each object contains a pointer to a next object, wherein all objects which define a block of data are linked into a list.

5. A method for transferring data in a computer system, comprising the steps of:
   (a) storing a plurality of objects containing control information for a block data transfer into a memory dedicated to a DMA controller, wherein the DMA controller accesses the memory independently from a system bus;
   (b) initiating a block data transfer according to control information stored in the DMA controller from a central processor, such transfer transmitting data over the system bus, and such transfer occurring independently from the central processor;
   (c) if a next object is stored in the memory, automatically performing a next block data transfer according to the control information stored therein; and
   (d) repeating step (c) until no more next objects remain in the memory.

6. The method of claim 5, wherein the memory accessible by the central processor only indirectly through the DMA controller.

7. The method of claim 5, wherein step (c) comprises the steps of:
   (c.1) transferring control information from the next object into control registers of the DMA controller; and
   (c.2) performing a block data transfer according to the control information in the control registers of the DMA controller.

8. The method of claim 5, wherein the objects are stored in the memory as a heap, wherein each object has a pointer to a next object, and wherein the objects which define related data transfers are linked into a list.

* * * * *